(12) United States Patent
Pendry

(10) Patent No.: US 9,871,234 B2
(45) Date of Patent: *Jan. 16, 2018

(54) LATCH MECHANISM FOR BATTERY RETENTION

(71) Applicant: ZOLL CIRCULATION, INC., San Jose, CA (US)

(72) Inventor: Craig Pendry, Milpitas, CA (US)

(73) Assignee: Zoll Circulation, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/256,329

(22) Filed: Sep. 2, 2016

(65) Prior Publication Data

US 2017/0162840 A1    Jun. 8, 2017

Related U.S. Application Data

(63) Continuation of application No. 13/459,004, filed on Apr. 27, 2012, now Pat. No. 9,437,848.

(60) Provisional application No. 61/522,207, filed on Aug. 10, 2011, provisional application No. 61/480,286, filed on Apr. 28, 2011.

(51) Int. Cl.
| | |
|---|---|
| *E05C 1/08* | (2006.01) |
| *H01M 2/10* | (2006.01) |
| *E05C 1/14* | (2006.01) |
| *E05C 1/02* | (2006.01) |
| *A61H 31/00* | (2006.01) |
| *E05C 1/00* | (2006.01) |
| *H01M 2/12* | (2006.01) |
| *H01M 10/42* | (2006.01) |

(52) U.S. Cl.
CPC ........ *H01M 2/1055* (2013.01); *A61H 31/006* (2013.01); *E05C 1/02* (2013.01); *E05C 1/08* (2013.01); *E05C 1/14* (2013.01); *A61H 2201/1207* (2013.01); *H01M 2/1235* (2013.01); *H01M 10/4257* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 35,803 | A * | 7/1862 | Nettleton | E05B 85/22 292/173 |
| 233,711 | A * | 10/1880 | Spencer | E05C 1/14 292/173 |
| 397,487 | A * | 2/1889 | Braillard | E05B 85/22 292/173 |
| 621,600 | A * | 3/1899 | Caldwell | E05B 85/22 292/173 |
| 947,528 | A * | 1/1910 | Hunter | E05B 85/22 292/148 |
| 2,649,322 | A * | 8/1953 | Mack | E05C 1/145 292/173 |
| 3,782,141 | A * | 1/1974 | Doerrfeld | E05C 1/145 292/173 |
| 3,789,550 | A * | 2/1974 | Seiwert | E05C 1/145 292/DIG. 31 |

(Continued)

*Primary Examiner* — Carlos Lugo
(74) *Attorney, Agent, or Firm* — Rutan & Tucker LLP; John K. Fitzgerald

(57) ABSTRACT

A latch mechanism for retaining a battery within a battery compartment.

6 Claims, 7 Drawing Sheets

(56) References Cited

U.S. PATENT DOCUMENTS

| | | | | |
|---|---|---|---|---|
| 5,153,817 A * | 10/1992 | Hosoi | | G06F 1/1635 361/679.37 |
| 5,292,159 A * | 3/1994 | Sandhu | | E05B 15/1635 292/173 |
| 5,311,397 A * | 5/1994 | Harshberger | | G06F 1/183 361/679.58 |
| 5,484,178 A * | 1/1996 | Sandhu | | E05B 83/30 292/169 |
| 5,926,545 A * | 7/1999 | Wu | | H01M 2/1055 379/433.08 |
| 6,109,674 A * | 8/2000 | Bartel | | E05B 81/06 292/201 |
| 6,211,648 B1 * | 4/2001 | Chew | | H01M 2/1022 320/112 |
| 6,373,693 B1 * | 4/2002 | Seto | | G06F 1/1616 361/679.33 |
| 6,560,100 B1 * | 5/2003 | Shin | | G06F 1/1616 361/679.41 |
| 6,722,716 B2 * | 4/2004 | Baser | | E05B 3/003 292/336.3 |
| 6,730,432 B1 * | 5/2004 | Grosfeld | | H01M 2/1066 206/703 |
| 7,273,239 B1 * | 9/2007 | Hauber | | E05B 65/0864 292/165 |
| 7,552,954 B2 * | 6/2009 | Rozo | | E05B 5/00 292/143 |
| 8,182,001 B2 * | 5/2012 | Tremble | | E05B 15/102 292/138 |
| 8,424,931 B2 * | 4/2013 | Chang | | G11B 33/123 292/137 |
| 9,437,848 B2 * | 9/2016 | Pendry | | H01M 2/1055 |
| 2006/0033344 A1 * | 2/2006 | Blake, III | | B29C 45/16 292/173 |
| 2006/0255596 A1 * | 11/2006 | Yong | | E05C 1/14 292/173 |

* cited by examiner

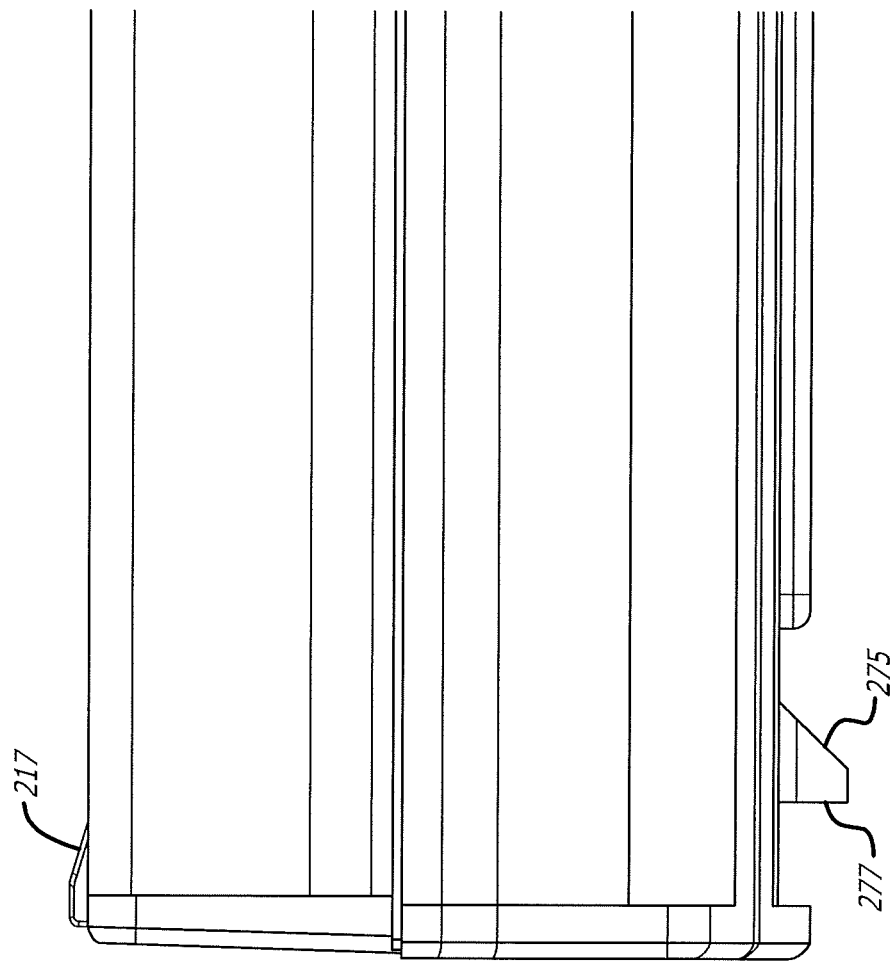

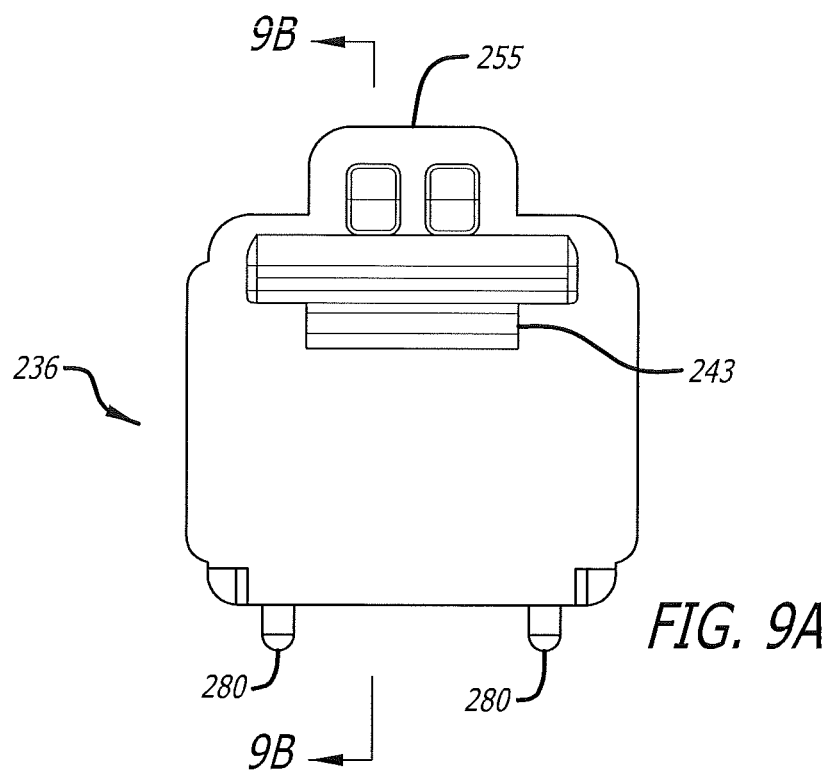
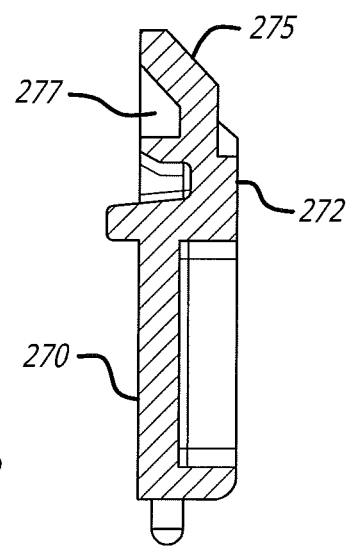

LATCH MECHANISM FOR BATTERY RETENTION

CROSS REFERENCES TO RELATED APPLICATIONS

This application is continuation of U.S. application Ser. No. 13/459,004, filed Apr. 27, 2012, now U.S. Pat. No. 9,437,848, issued Sep. 6, 2016, and claims the benefit of priority to U.S. Provisional Application No. 61/522,207, filed Aug. 10, 2011, and U.S. Provisional Application No. 61/480,286, filed Apr. 28, 2001, the entireties of which are hereby incorporated herein by reference.

FIELD OF THE INVENTION

The invention is directed to a battery pack for providing power to a device. More specifically, the invention is directed a battery pack having a latch mechanism for reliably retaining the battery pack in a device to be powered by the battery.

BACKGROUND OF THE INVENTION

Cardiopulmonary resuscitation (CPR) is a well-known and valuable method of first aid used to resuscitate people who have suffered from cardiac arrest. CPR requires repetitive chest compressions to squeeze the heart and the thoracic cavity to pump blood through the body. Artificial respiration, such as mouth to mouth breathing or a bag mask apparatus, is used to supply air to the lungs. When a first aid provider performs manual chest compression effectively, blood flow in the body is about 25% to 30% of normal blood flow. However, even experienced paramedics cannot maintain adequate chest compressions for more than a few minutes. Hightower, et al., Decay In Quality Of Chest Compressions Over Time, 26 Ann. Emerg. Med. 300 (September 1995). Thus, CPR is not often successful at sustaining or reviving the patient. Nevertheless, if chest compressions could be adequately maintained, then cardiac arrest victims could be sustained for extended periods of time. Occasional reports of extended CPR efforts (45 to 90 minutes) have been reported, with the victims eventually being saved by coronary bypass surgery. See Tovar, et al., Successful Myocardial Revascularization and Neurologic Recovery, 22 Texas Heart J. 271 (1995).

In efforts to provide better blood flow and increase the effectiveness of bystander resuscitation efforts, various mechanical devices have been proposed for performing CPR. In one variation of such devices, a belt is placed around the patient's chest and an automatic chest compression device tightens the belt to effect chest compressions. Our own patents, Mollenauer et al., Resuscitation device having a motor driven belt to constrict/compress the chest, U.S. Pat. No. 6,142,962 (Nov. 7, 2000); Bystrom et al., Resuscitation and alert system, U.S. Pat. No. 6,090,056 (Jul. 18, 2000); Sherman et al., Modular CPR assist device, U.S. Pat. No. 6,066,106 (May 23, 2000); and Sherman et al., Modular CPR assist device, U.S. Pat. No. 6,398,745 (Jun. 4, 2002); and our application Ser. No. 09/866,377 filed on May 25, 2001, our application Ser. No. 10/192,771, filed Jul. 10, 2002 and our application Ser. No. 12/726,262, filed Mar. 17, 2010 show chest compression devices that compress a patient's chest with a belt. Each of these patents or applications is hereby incorporated by reference in their entireties.

Since seconds count during an emergency, any CPR device should be easy to use and facilitate rapid deployment of the device on the patient. Our own devices are easy to deploy quickly and may significantly increase the patient's chances of survival.

One important aspect of such devices is the need for small, powerful yet reliable power supply to power the device. It is not uncommon for CPR to be administered for at least thirty minutes. Thus, the power supply must be capable of delivering sufficient energy to the motor driving the compression device for at least that length of time. Moreover, the power supply must be relatively light weight, so as to enhance portability of the chest compression device, yet it must deliver its power for an extended period of time without significant voltage or current drop off to ensure consistency of compression throughout the treatment period.

Since a mechanical compression device is often transported to a remote location, the device must be robust enough to withstand not only the jolts and jostles of transportation, but also the shock of being dropped or roughly handled when being placed into position to accept a patient. For example, under such use the battery pack powering the device may become disengaged from the device when it is dropped or jostled. Such disengagement will require, at the least, re-insertion of the battery in the battery compartment, and may even cause damage to the battery requiring replacement of the battery.

Even if the battery is not completely disengaged, the battery may become loose in the battery compartment. This may cause a disconnection of the battery during use which will stop operation of the mechanical compression device, and require quick troubleshooting by the user of the device to determine why the device is no longer operating. Such a loose engagement may also increase the resistance of the electrical connection between the battery and the device. This increased resistance may lead to a decreased battery capacity, requiring compressions to be halted for replacement of the battery in a shorter than expected time.

What has been needed, and heretofore unavailable, is a light weight, reliable battery pack having a latch mechanism capable of retaining the battery within a device to be powered even when exposed to forces resulting from jolts and other trauma occurring during transportation or rough handling of the powered device as it is carried to a patient or when the patient is placed on the device. Such a latch must be reliable and easy to engage and disengage to facilitate rapid insertion and removal of the battery from a battery compartment. It would also be useful to provide a visual indication that the battery latch if fully engaged with the battery compartment. The present invention satisfies these, and other needs.

SUMMARY OF THE INVENTION

In a most general aspect, the invention provides a latch mechanism for ensuring the retention of a high-performance battery pack in a device to be powered by the battery pack. The latch mechanism is configured to engage with a portion of the device to be powered in a manner that will ensure retention of the battery within the device in the event the device is bumped, dropped, roughly handled, or otherwise submitted to a shock that might otherwise cause the battery to disengage from the powered device. In one aspect, the latch mechanism of the present invention may prevent inadvertent disengagement of the battery leading to cessation of operation of the powered device, which, depending on the circumstances surround the use of the device, could be damaging or harmful.

In another aspect, the present invention includes a latch assembly for retaining a battery within a battery compartment, comprising: a housing having a first end and a second end, the housing defining four sides of a battery pack configured for insertion into a battery compartment, the housing also having a slot formed in one of the sides at the first end of the housing; a latch having a projection formed on a first end of the latch and configured to moveably extend through the slot in the housing, the projection having a first, angled, side and a second, flat, side, the latch also having a second end opposite the first end of the latch, and a front face and a rear face, the front face having a slot disposed therein; a compression spring disposed between the second of the latch and a side of the housing opposite the slot, the spring for biasing the latch upwards extending the projection through the slot into a position for engaging a latch receiver disposed in a device to be powered by the battery pack; and a latch lever pivotally mounted at the first end of the housing, the latch lever having a wing and a toggle disposed about the pivot perpendicular to each other, the wing configured to engage the slot disposed in the front face of the latch such that movement of the toggle causes the wing to impart movement to the latch within the housing to withdraw the projection into the slot of the housing.

In still another aspect, the latch lever includes a pair of pins that engage a mount attached to the housing to hold the latch lever in place and allow the latch lever to pivot.

In yet another aspect, the latch assembly further includes a lever base mounted on the housing and configured to receive the pair of pins of the latch lever to retain the latch lever on the housing and to provide for pivotal movement of the lever. In yet another aspect, the latch lever includes a channel extending longitudinally through an area where the wing and toggle join, the channel sized to receive an axle having a length greater than a longitudinal width of the latch lever.

In still another aspect, the latch assembly further comprises a lever base mounted on the housing and configured to receive at least a portion of the axle to retain the latch lever on the housing and to provide for pivotal movement of the lever. In yet another aspect, the latch lever includes an indicator that is only visible when the projection of the latch is not fully extended through the slot in the housing.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 5 is a side view of an end of the battery pack of FIG. 4A showing details of tabs and a latch for retaining the battery pack in a charger or device to be powered.

FIG. 9A is a front view of a latch in accordance with principles of the present invention.

FIG. 9B is a cross-sectional view of the latch of FIG. 9A illustrating additional details of the latch.

DETAILED DESCRIPTION OF THE PREFERRED EMBODIMENTS

Figure 1:
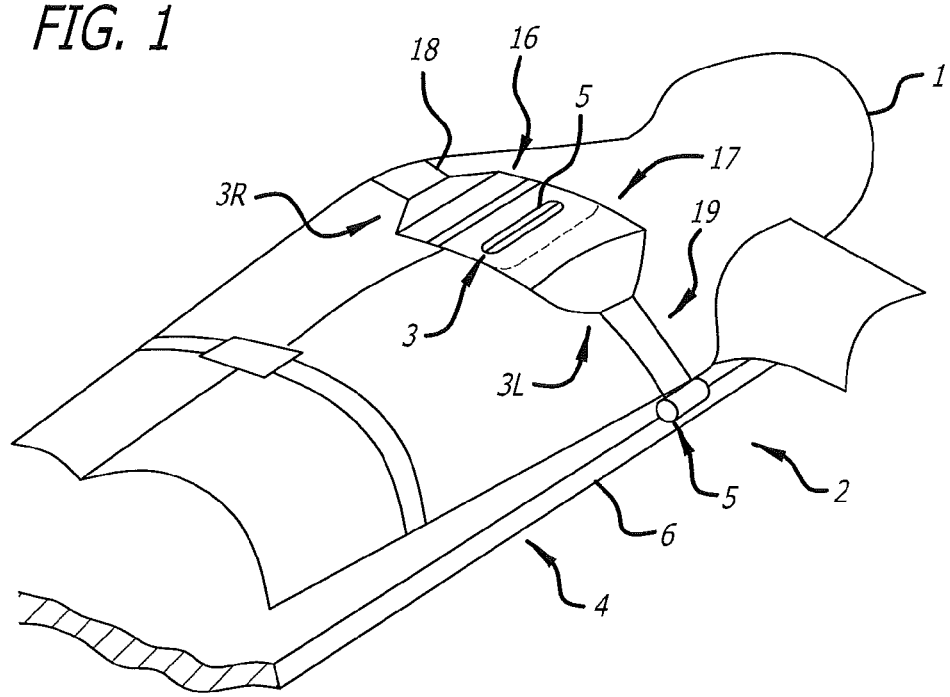
FIG. 1 illustrates a method of performing chest compressions on a patient by using a mechanical chest compression device.

The various embodiments of the present invention are directed to providing a rechargeable battery for powering mobile equipment, particularly medical devices. The embodiments of the invention are particularly advantageous when the battery is required to provide a large amount of current over a predictable period of time. Moreover, the embodiments of the invention include a battery management system that controls all aspects of the operation of the battery, and also includes a memory in which events related to the battery that occur during the battery's lifetime are stored. Moreover, embodiments of the battery management system include the capability of accommodating batteries using different battery chemistries, and are also capable of being updated through a communication port.

While the various embodiments of the invention are described with reference to a mechanical compressions device, those skilled in the art will immediately appreciate that those embodiments are not to be limited to powering such a device. Indeed, such a use is merely exemplary, and a battery in accordance with the various embodiments of the present invention may be used to power any device, and in particular, medical devices, wherein the design requirements of the device are met by the capabilities of such a battery.

When a battery in accordance with the various embodiments of the present invention is used with a mechanical compression device, the battery must be capable of powering the mechanical compression device for long enough to treat the patient not only in the field, but also during transport of the patient from the field to a care center. Experience has shown, however, that a patient's size and weight are factors that determine the amount of current drain on the battery during treatment. Accordingly, treatment of a larger than average patient results in a larger current draw on the battery.

For example, studies have found that the chest depth, chest breadth and chest circumference are factors influencing the amount of current drain on a battery powering a mechanical compression device. Other studies have observed that the mean chest depth of an average adult human male is 9.4 inches, mean chest breadth is 12.2 inches and mean chest circumference is 39.7 inches. See, Young, J W, R F Chandler, C C Snow, K M Robinette, G F Zehner, M S Lofberg, Anthropometric and Mass Distribution Characteristics of the Adult Female, FAA Civil Aeromedical Institute, Oklahoma City, Okla., Report No. FAA-AM-83-

16, 1983; Anthropometry and Mass Distribution for Human Analogues: Volume 1: Military Male Aviators, Report No. USAFSAM-TR-88-6, March 1988; Haslegrave, C M, "Characterizing the anthropometric extremes of the population", *Ergonomics*, 29:2, pp. 281-301, 1986; Diffrient, N, A R Tilley, J C Bardagy, *Human Scale* 1/2/3, The MIT Press, Cambridge, Mass. 1974; and *PeopleSize Pro* Software, Open Ergonomics Ltd., 34 Bakewell Road, Loughborough, Leicestershire, LE11 5QY, United Kingdom, the entireties of which are hereby incorporated by reference herein. A battery that can sustain operation of the mechanical compression device for at least thirty minutes for an average size patient, and at least twenty minutes for a larger than average size patient is advantageous.

Referring now to the drawings in detail, in which like reference numerals indicate like or corresponding elements among the several figures, there is shown in FIG. 1 a chest compression belt fitted on a patient 1. A chest compression device 2 applies compressions with the belt 3, which has a right belt portion 3R and a left belt portion 3L. The chest compression device 2 includes a belt drive platform 4 and a compression belt cartridge 5 (which includes the belt). The belt drive platform includes a housing 6 upon which the patient rests, a means for tightening the belt, a processor and a user interface disposed on the housing. The belt includes pull straps 18 and 19 and wide load distribution sections 16 and 17 at the ends of the belt. The means for tightening the belt includes a motor attached to a drive spool, around which the belt spools and tightens during use. The design of the chest compression device, as shown herein, allows for a lightweight electro-mechanical chest compression device. The fully assembled chest compression device weighs only 29 pounds, and is thus hand-portable over long distances. The device itself weighs about 22.0 to 23.0 pounds, with the battery, in at least one embodiment of the present invention, weighing between 2 and 5.0 pounds, and preferably about 3 pounds. The belt cartridge weighs about 0.8 pounds and the straps to secure the patient weigh about 1.6 pounds.

Figure 2:
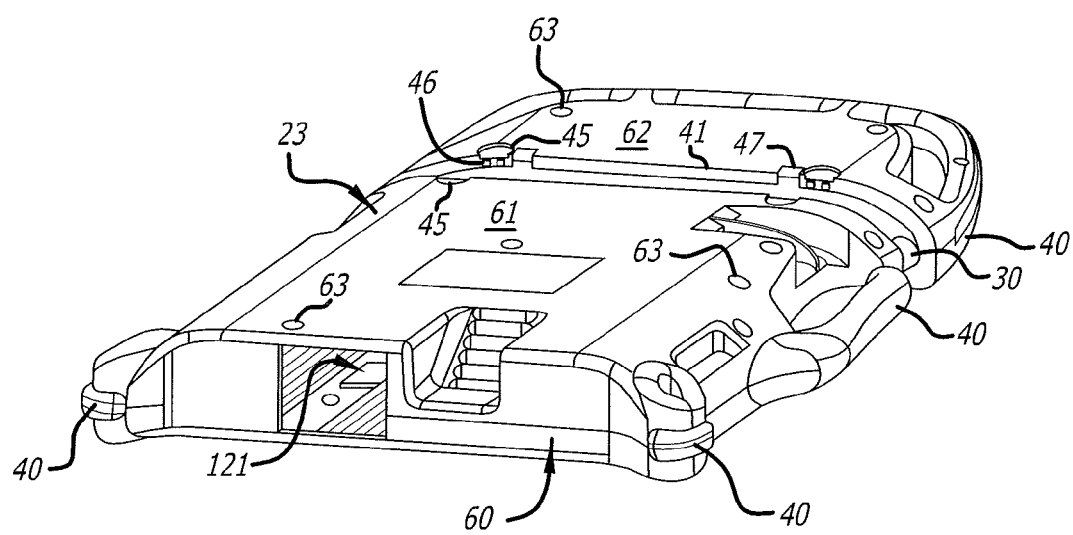
FIG. 2 is perspective view of the mechanical chest compression device of FIG. 1 showing the bottom and front sides of the device.

FIG. 2 shows the posterior side 23 of the chest compression device as seen from the superior direction. In the perspective of FIG. 2, the average sized patient's buttocks and the back of the patient's legs would extend past the inferior bumper 40. The device is built around a sturdy channel beam 41 that is laterally oriented with respect to the housing. The channel beam supports the device against the forces created during compressions. The channel beam also serves as the structure to which the belt cartridge is attached.

The channel beam 41 forms a channel extending across the lateral width of the device. During compressions, the belt is disposed in and travels along the channel. The belt is attached to a drive spool 42 that spans the channel.

Figure 3:
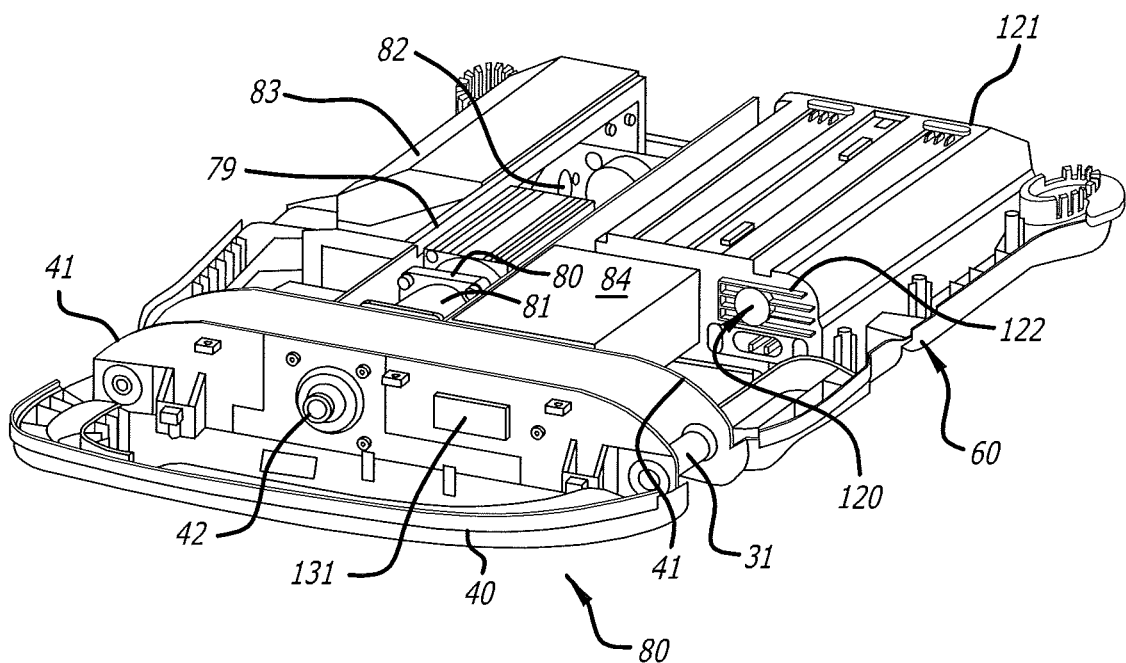
FIG. 3 is a perspective view of the mechanical chest compression device of FIG. 1 showing the bottom and rear cover plates removed.

FIG. 3 shows internal components of the chest compression device 2. A motor 79 is operable to provide torque to the drive spool 42 through a clutch 80 and a gearbox 81. A brake 82, attached to the superior side of the motor, is operable to brake the motion of the drive spool. The brake hub connects directly to the rotor shaft of the motor.

The motor 79 and brake 82 are controlled by a processor unit 83, motor controller 84 and power distribution controller, all of which are mounted to the inside of the anterior cover plate 60. The processor unit includes a computer processor, a non-volatile memory device and a display.

The processor unit is provided with software used to control the power controller and the motor controller. Together, the processor unit, power controller and motor controller make up a control system capable of precisely controlling the operation of the motor. Thus, the timing and force of compressions are automatically and precisely controlled for patients of varying sizes.

FIGS. 2 and 3 also show the location of a battery compartment 121 near the head of the patient. The location and design of the battery pack and battery compartment allow for rapid exchange of batteries. A spring in the back of the compartment forces the battery pack out unless the battery pack is fully and correctly inserted in the compartment. A latch on one end of the battery pack engages a receiver in the battery compartment 121 to hold the battery pack within the batter compartment when the battery pack is inserted into the battery compartment. Recesses 120 indicate the location of the springs inside the battery compartment 121. Plastic grills 122 at the end of the battery compartment reinforce the recesses.

Figure 4A:
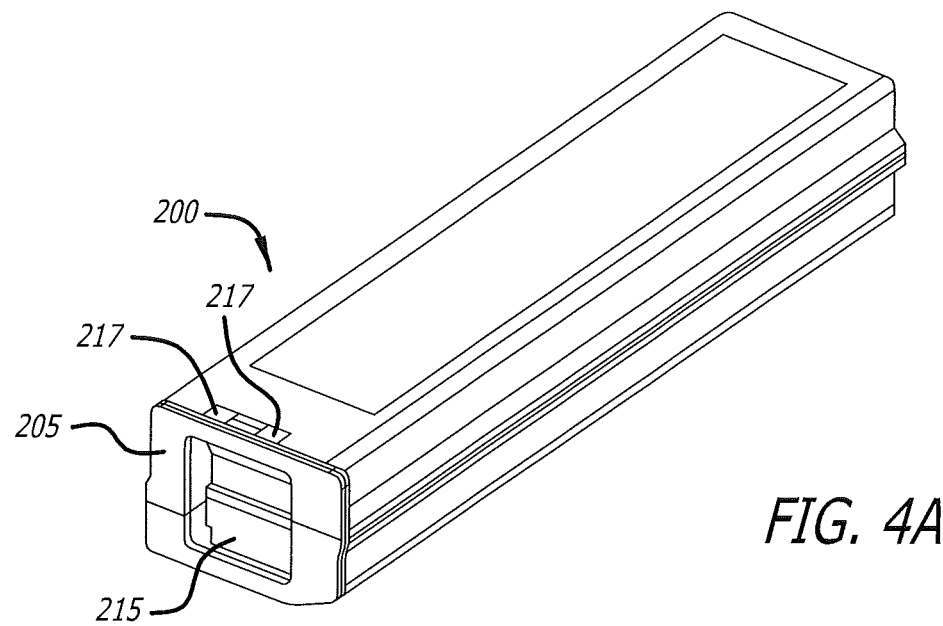
FIG. 4A is perspective view of a battery pack in accordance with the present invention showing a battery latch disposed on a front side of the battery pack.
Figure 4B:
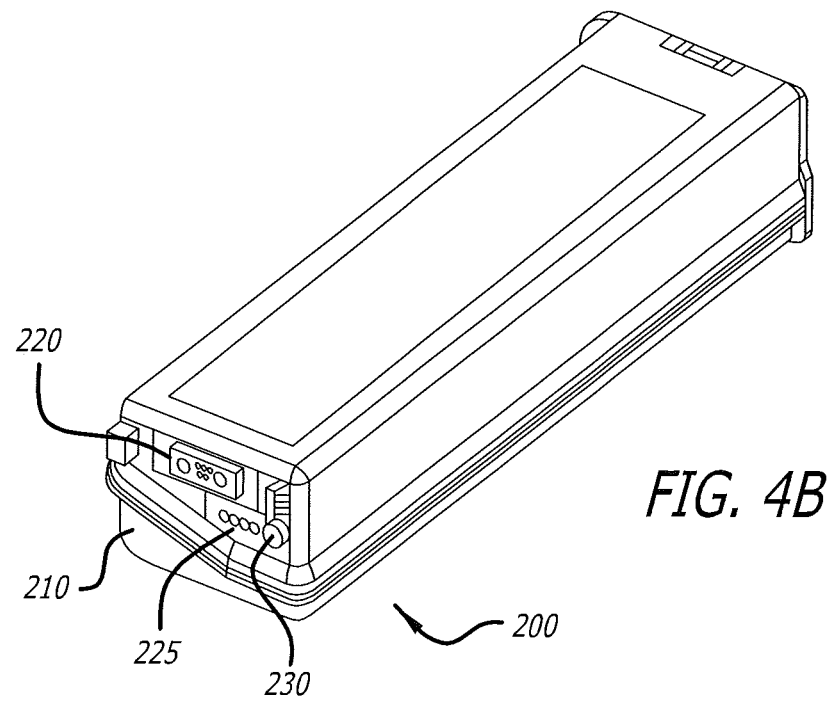
FIG. 4B is a perspective view of the battery pack of FIG. 4A showing a connector, indicator and button disposed on a back side of the battery pack.

FIGS. 4A and 4B are perspective views of a battery pack 200 showing the front and back sides 205, 210 of the battery pack respectively. Front side 205 of the battery pack faces outward and is visible to the user when the battery pack is inserted into the battery compartment 121 (FIG. 3). As shown in FIG. 4A, front side 205 includes a latch 215 that engages a receiver within battery compartment 121 to hold the battery pack 200 within the battery compartment. Also shown in FIG. 4A are a pair of raised tabs 217 disposed on the tops side of the front end of the battery pack. These tabs cooperate with the latch to ensure that the battery is properly seated in the battery compartment by prevent the top of the battery from riding up during battery insertion, forcing the latch into proper engagement with a battery latch receiver or lip of the battery compartment.

FIG. 5 is a side view of the battery pack of FIG. 4A showing additional details of the tabs 217 and the latch. Tabs 217 are sloped to engage the lip of the battery compartment. This slope applies a force onto the battery pack to counter act the spring pressure on the latch caused by compression springs 254 (FIG. 6) to ensure that the battery pack does not hang up on the lip of the battery compartment as the battery pack is inserted into the battery compartment, which may cause a false sense of engagement of the battery pack. This downwards force compensates for any mismatch between the size of the battery and the size of the battery compartment of the device to be powered and ensures that the latch fully engages the inside lip of the battery compartment when the battery pack is fully inserted into the battery compartment.

The back side 210 of the battery pack, as seen in FIG. 4B, includes a connection 220 that connects to a connector within battery compartment 121 to enable electrical communication between the controller or processor of the mechanical compression device and the battery pack 200. This connector not only allows for the flow of current from the battery pack to power the mechanical compression device, but it also provides for the flow of data, programming commands and other information, such as battery charge status, discharge rate, time remaining until discharged, and the like between the battery pack and the processor or computer controlling the operation of the mechanical compression device. Similarly, connector 220 may be configured to be connected to a connector in a battery charger to charge the cells of the battery pack, as well as to provide for the flow of data, software programs or commands and/or other information between the charger and the battery pack It is also contemplated that connector 220 may be used to connect the battery pack to a communication network that would allow for flow of information between the battery pack and other computers, servers, processor or devices that are also connected to the network.

It will be understood that the network may be a wired network, such as, for example, an Ethernet, or it may be a wireless network. The network may be a local network, or it may be a wide area network, such as a WLAN or the Internet.

A status indicator 225, which may be, for example, one or more light emitting diodes (LEDs) or similar devices, is also disposed on the back end 210 of battery pack 200 to provide a visual indication of, for example, the charge/discharge status of the battery pack, the presence of any faults that would affect the operation of the battery pack, or other information that might be useful to the user of the battery. A push button 230 is also included; button 230 may be used, for example, to initiate a reset of the battery pack. Alternatively, button 230 may be used to initiate a diagnostic test, the results of which may be indicated by status indicator 225. In other embodiments, pressing button 230 may initiate other functions of the processor in the battery pack, including, for example, and not by way of limitation, determining the remaining capacity of the battery, display of fault codes through the use of status indicator 225 and the like.

Figure 6:
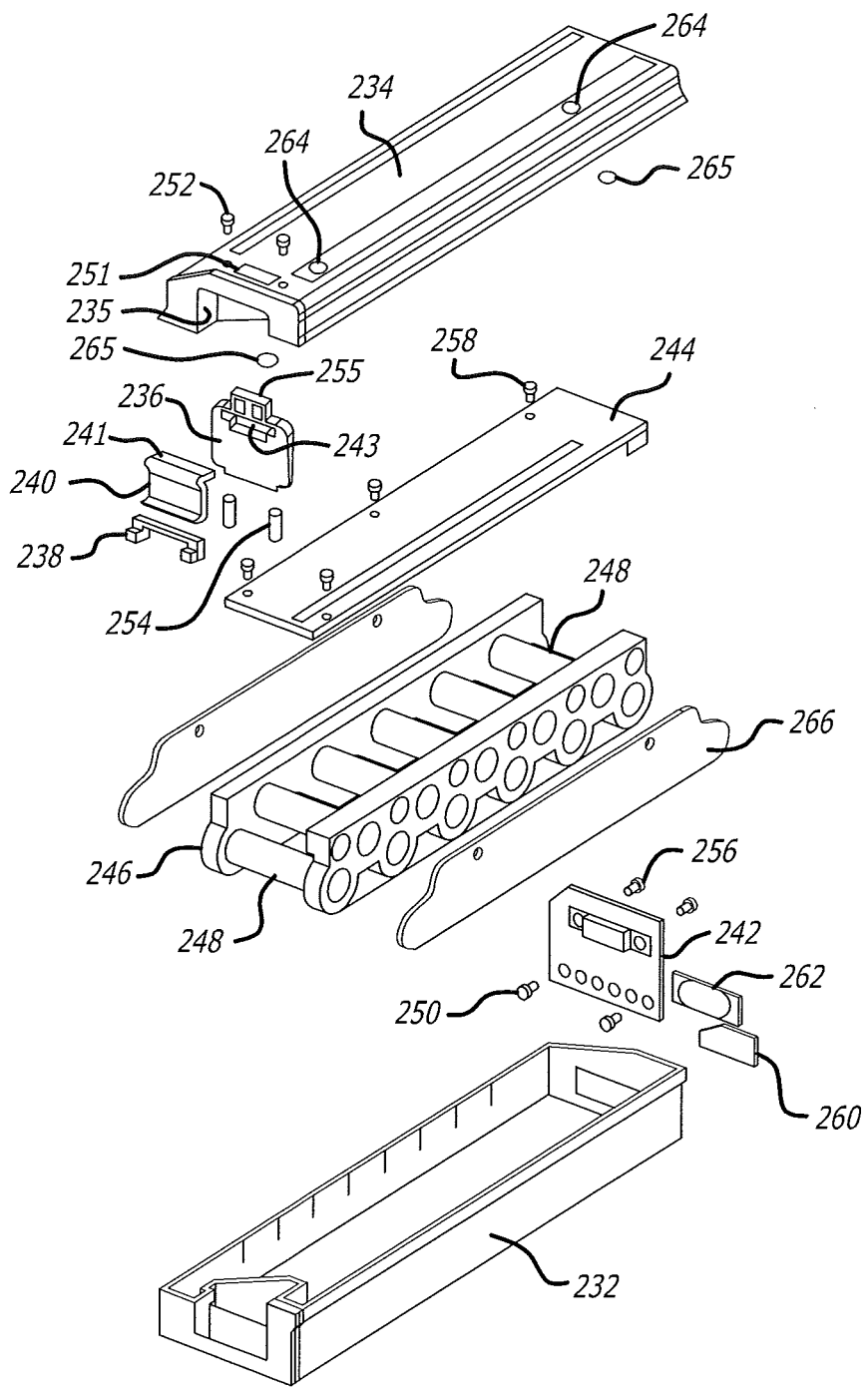
FIG. 6 is an exploded perspective view illustrating various components of one embodiment of a battery pack of the present invention.

FIG. 6 is an exploded perspective view of the battery pack 200. The battery pack 200 in this exploded view has been inverted from the view of FIGS. 4A and 4B. The battery pack has a bottom enclosure 234 and a top enclosure 232. A battery latch assembly having a battery latch 236, a lever base 238 and a lever latch 240 is mounted at the side of the battery pack facing outward when the battery pack is inserted into a battery compartment, and is held in place by the bottom and top enclosures. Lever latch 240 has a wing 241 that is inserted into a groove or slot 243 formed in a face of battery latch 236, and lever base 238 is mounted on the bottom enclosure to pivotally hold lever latch 240 in the enclosure. Compression springs 254 are disposed between a bottom end of battery latch 236 and top enclosure 232. A projection 255 is disposed a top end of battery latch 238, and is configured to protrude through slot 251 that extends through a thickness of the bottom enclosure 234. In this manner, battery latch 236 may be manipulated by a user to engage and disengage projection 255 from the latch receiver located in the mechanical compression device to insert the battery pack into the battery compartment and to release the battery pack for removal from battery compartment 121.

Disposed at the back end 210 of the battery pack is a battery entry board 242 to which is mounted connector 220, indicator 225 and button 230 (FIG. 4B). Entry board 256 is mounted to bottom enclosure 232 using one or more screws 250. The entry board may also be fastened to top enclosure 252 using one or more screws 256. In some embodiments, a water resistant gasket 262 may be used to resist the incursion of fluids into the interior of the battery pack. Moreover, a label 260 may be used to provide information to a user relative to the various indications that maybe provided by indicator(s) 225.

A battery management board 244 to which is mounted processors, memory and electrical circuitry for managing the various operations of the battery (which is described in more detail below) is mounted using screws or other fasteners 258 to battery cell assembly 246. Battery cell assembly 246 includes one or more battery cells 248. Battery cells 248 may be cells utilizing a variety of battery chemistries, such as, for example, nickel metal hydride, lithium hydride, lithium-ion and the like. Battery management board 244 and battery cell assembly 246 may also include a pair of splatter shields 266 mounted on left and right sides of battery cell assembly 246 to protect the terminals of the individual battery cells 248 from inadvertent contact with other parts of the assembly, thus providing a shield against short circuit of the battery cells.

Battery pack 200 also includes at least one vent 264, shown disposed in the top enclosure to allow for venting of the battery pack to prevent buildup of potentially flammable or explosive gases produced by the battery cells 248 during charging or discharging of the battery pack. While shown disposed in the top enclosure, those skilled in the art will appreciate that the vents may be disposed through any wall or side of the battery pack. Vents 264 may be a simple hole extending through the wall or side of the battery pack. Alternatively, vent 264 may include a filtering means 265, such as a screen or hydrophobic membrane to prevent the incursion of particulates or fluids or moisture into the interior of the battery pack. An additional advantage of such vents is that the vent or vents provide for equalization of pressure between the interior and exterior of the battery pack, such as may occur when the battery pack is transported to a higher or lower altitude.

Battery Pack and Latch

FIG. 6 is an exploded perspective view of the battery pack 200. In this view, the battery pack has been turned over so that the bottom enclosure of the battery is at the top of the view. The battery pack has a bottom enclosure 232 and a top enclosure 234. A battery latch assembly having a battery latch 236, a lever base 238 and a lever latch 240 is mounted at the front side of the battery pack and held in place by screws 252 to the bottom enclosure 232.

Figure 7A:
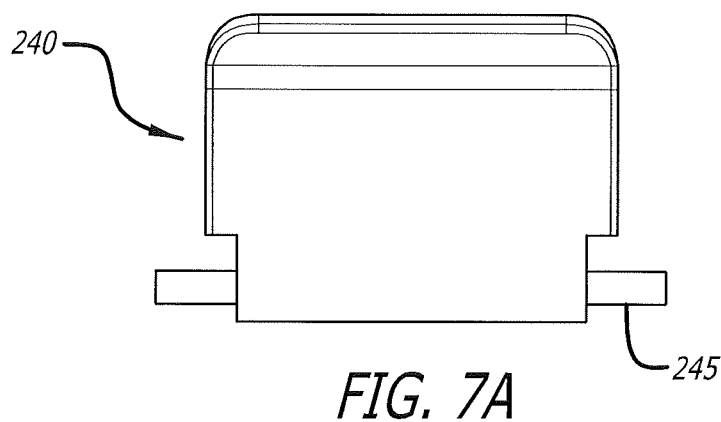
FIG. 7A is a front view of a latch lever in accordance with principles of the present invention.
Figure 7B:
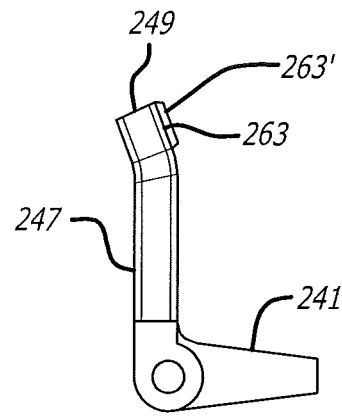
FIG. 7B is a side view of the latch lever of FIG. 7A.

FIG. 7A is an end view of lever latch 240, and FIG. 7B is a side view of lever latch 240, with each view showing more details of the level latch. As seen in FIG. 7B, lever latch 240 has a wing 241 that is configured to be inserted into a slot 243 in battery latch 236 (FIG. 6). Lever latch 240 also has a pivot mechanism 245 that provides for pivotal motion of the lever latch when the lever latch is mounted in the lever base 238. Pivot mechanism 245 may be a pair of pins integrally molded or formed as part of the lever latch. Alternatively, pivot mechanism may be an axle extending through a hollow channel formed into the latch lever. The hollow channel may extend fully or partially, or discontinuously through the latch lever.

Besides wing 241, latch lever also has a toggle lever 247. Wing 241 and toggle lever 247 are arranged so that wing 241 is approximately perpendicular to toggle lever 247. In this arrangement, translation of toggle lever 247 will impart movement to wing 241. This movement is transmitted to the battery latch 236 to move the battery latch up and down within a slot (not shown) formed into the bottom enclosure 232. Those skilled in the art will understand that while wing 241 and toggle lever 247 are shown arranged perpendicularly to one another, such an arrangement is not necessary to the proper functioning of the invention, and that the wing and toggle may have an angle of less than or greater than 90 degrees and still function as contemplated by the inventor. In some embodiments, toggle lever 247 may have a distal end 249 that is offset by a slight angle from the remainder of toggle lever 247 to facilitate easier manipulation by a user.

In another embodiment, an indicator 263' (FIG. 7B), such as, for example, a label, color or other appropriate device may be affixed to the latch lever at the position indicated by reference numeral 263 to provide a visual indication that the latch lever is open or closed. For example, referring now to FIG. 4A, when the latch lever is fully closed, a label or color 263' at location 263 of the latch lever will not be visible. However, if the battery pack is not fully inserted into a battery compartment, the latch lever will not be fully closed, and the label or color at location 263 will be visible to a user, thus providing a clear visual indication to the user that the battery pack is not completely inserted into the battery compartment.

Figure 8:
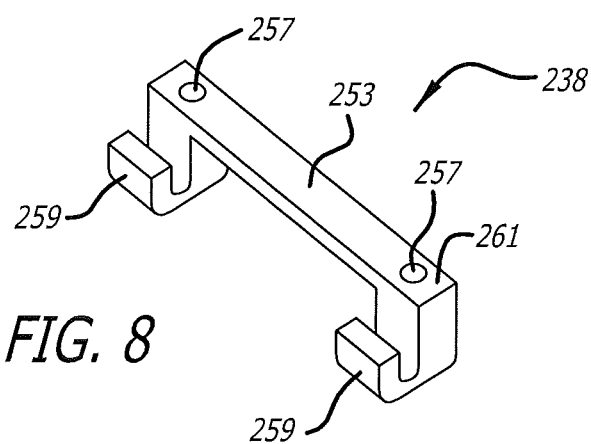
FIG. 8 is a perspective view of a latch base in accordance with principles of the present invention.

Lever base 238 is configured to accept the pivot mechanism 245 of lever latch 240. Accordingly, one embodiment of lever base 238 is shown in FIG. 8 having two hooks 251 disposed at a right and left side of center bar 253. Hooks 259 are configured to receive and retain the ends of pivot mechanism 245 of lever latch 240, Center bar 253 has a bottom side 261, into which are bored two holes 257, Holes 257 are configured to receive a fastener, such as, for example, a screw 252 (FIG. 6). Screws 252 are used to mount lever base 238 to the bottom enclosure 234. When lever base 238 is mounted to bottom enclosure 234, lever base 238 holds lever latch 240 in place, with wing 241 extending into slot 243 of lever latch 236. Returning again to FIG. 6, compression springs 254 are disposed between a top end of battery latch 236 and bottom enclosure 232.

FIGS. 6 and 9 illustrate details of one embodiment of the latch 236. A projection 255 is disposed at a bottom end of battery latch 236, and is configured to protrude through slot 252 that extends through a thickness of the bottom enclosure 232 to engage with a latch receiver or lip (not shown) of the battery compartment into which the batter pack is inserted. Latch 236 has a face 270 which will typically face towards the rear of the battery back, into which a groove or slot is formed for receiving wing 241 of the latch lever 240. Face 272 typically faces towards the interior of the battery pack.

Two pins 280 are disposed on a top end (note, the latch of FIGS. 9A and B is shown upside down) of latch 236. Pins 280 may formed integrally with latch 236, or they may be separate plastic or metal pieces fixedly mounted to latch 236. Compression springs 254 are engaged by pins 280 to maintain springs 254 in proper alignment to provide a bias force between the top enclosure 232 and the top end of latch 236.

Both top enclosure 232 and bottom enclosure 234 include a groove or grooves 235 formed adjacent the front end of the battery pack to slidably receive latch 236 and hold latch 236 in place. Latch 236 slides up and down within the groove or grooves 235 so that the latch can engage and disengage the latch receiver or lip of the battery compartment of the device to be powered.

Projection 255 of latch 236 has a sloped leading surface 275 such that when the battery pack is inserted into the battery compartment, the sloped leading surface first engages the latch receiver or lip of the battery compartment, progressively compressing springs 254 to allow the latch 236 and projection 255 to be forced upward into the interior of the battery. Once the battery has been inserted completely into the battery compartment, compression springs 254 bias battery latch 236 back downwards so that a flat rearwards surface of projection 255 engages the latch receiver or lip to retain the battery in the battery compartment.

When the battery needs to be removed for charging or for replacement, a user may manipulate latch lever 240 such that latch lever 240 pivots about pivoting mechanism 245. When latch lever 240 pivots in this manner, force is exerted through wing 241 to move the latch 236 upwards against the bias of compression springs 254, causing the projection 255 to be withdrawn into the interior of the battery and out of engagement with the latch receiver or lip of the battery compartment until the battery may be freely removed from the battery compartment.

While several particular forms of the invention have been illustrated and described, it will be apparent that various modifications can be made without departing from the spirit and scope of the invention.

I claim:

1. A latching system for retaining a battery pack within a battery compartment, comprising:
   a housing having a first end and a second end, the housing defining four sides of the battery pack, the housing also having a slot formed in one of the sides at the first end of the housing, the battery pack configured for insertion into an opening of the battery compartment, the opening of the battery compartment defined by a lip;
   at least one tab disposed at the first end of the housing on a side of the housing opposite the side of the housing having the slot, the tab having a first face facing the first end of the housing and a second face facing towards the second end of the housing, the second face configured to engage a portion of the lip of the opening of the battery compartment to force the first end of the housing towards a side of the battery compartment while the housing is being inserted into the battery compartment;
   a latch having a projection fat lied on a first end of the latch and configured to moveably extend through the slot in the housing;
   a spring configured to bias the projection through the slot; and
   a latch lever pivotally mounted at the first end of the housing to withdraw the projection into the slot of the housing.

2. The latch assembly of claim 1, wherein the latch lever includes a pair of pins that engage a mount attached to the housing to hold the latch lever in place and allow the latch lever to pivot.

3. The latch assembly of claim 2, further comprising a lever base mounted on the housing and configured to receive the pair of pins of the latch lever to retain the latch lever on the housing and to provide for pivotal movement of the lever.

4. The latch assembly of claim 1, wherein the latch lever includes a channel extending longitudinally through an area the latch lever, the channel sized to receive an axle having a length greater than a longitudinal width of the latch lever.

5. The latch assembly of claim 4, further comprising a lever base mounted on the housing and configured to receive at least a portion of the axle to retain the latch lever on the housing and to provide for pivotal movement of the lever.

6. The latch assembly of claim 1, wherein the latch lever includes an indicator that is only visible when the projection of the latch is not fully extended through the slot in the housing.

* * * * *